No. 12,283. REISSUED NOV. 15, 1904.

A. F. MEISSELBACH & W. MEISSELBACH, JR.

FISHING REEL.

APPLICATION FILED SEPT. 2, 1904.

2 SHEETS—SHEET 1.

Witnesses:
Guy Edwards
F. Philbrick

Inventors.
A. F. Meisselbach
W. Meisselbach Jr. by
Fischer and Sanders Attys.

No. 12,283. REISSUED NOV. 15, 1904.

A. F. MEISSELBACH & W. MEISSELBACH, JR.

FISHING REEL.

APPLICATION FILED SEPT. 3, 1904.

2 SHEETS—SHEET 2.

Witnesses:
Guy L. Edwards
F. Philbrook

Inventors.
A. F. Meisselbach
W. Meisselbach, Jr. by
Fischer and Sanders Attys

No. 12,283. Reissued November 15, 1904.

UNITED STATES PATENT OFFICE.

AUGUST F. MEISSELBACH AND WILLIAM MEISSELBACH, JR., OF NEWARK, NEW JERSEY.

FISHING-REEL.

SPECIFICATION forming part of Reissued Letters Patent No. 12,283, dated November 15, 1904.

Original No. 746,544, dated December 8, 1903. Application for reissue filed September 2, 1904. Serial No. 223,080½.

*To all whom it may concern:*

Be it known that we, AUGUST F. MEISSELBACH and WILLIAM MEISSELBACH, Jr., citizens of the United States, residing at No. 16 Prospect street, Newark, county of Essex, State of New Jersey, (whose post-office addresses are the same,) have invented certain new and useful Improvements in Fishing-Reels with Adjustable Heads, fully described and represented in the following specification and the accompanying drawings, forming a part of the same.

This invention belongs to that class of fishing-reels in which the spool may be readily removed from the frame without the use of any tools to remove screws or nuts. Such facility for removing the spool permits it to be kept clean and also facilitates the examination, adjustment, and oiling of the driving and click gearing.

The invention also includes an improved form of click in which the click wheel or pinion is connected with the spindle of the spool by a clutch, so as to actuate the click only when the line is running out. By this construction the click makes no noise when reeling in, and an oarsman assisting the fisherman may learn by the noise of the click when the fish has taken the bait and may govern the movements of the boat accordingly.

The invention also includes a means of adjusting the bearings of the spindle without conical points, as such points when slackened allow the spool to drop partly out of gear with the driving-wheel. In the present construction we form cylindrical journals upon the ends of the spindle and fit screw-plugs to a threaded socket in one or both of the reel-frame heads, such plugs having cylindrical bearings for the journals and being adapted when screwed inwardly to adjust the spool longitudinally or to produce a pressure upon the end of the spindle to operate as a drag for the line.

The invention also includes other details of construction, which will be understood by reference to the annexed drawings, in which—

Figure 1:
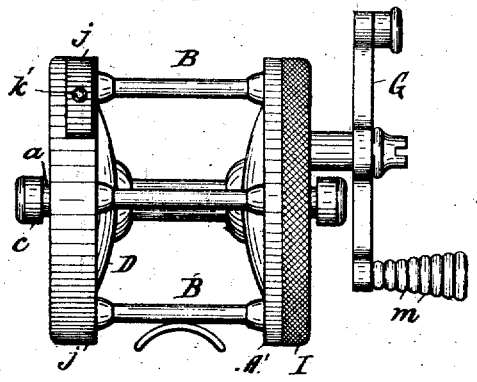
Figure 3:
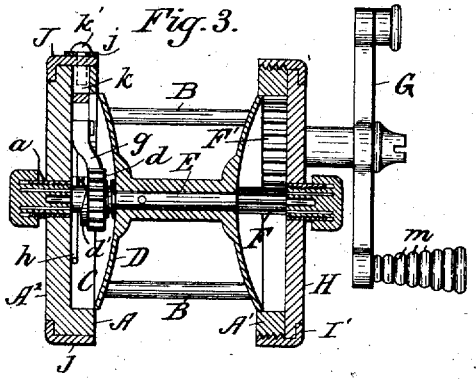
Figure 2:
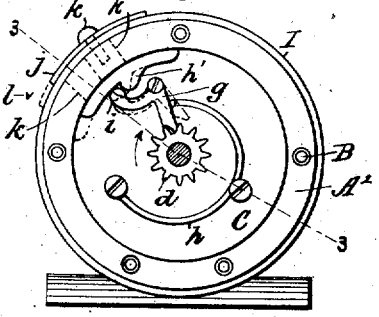
Figure 4:
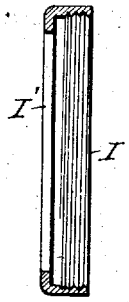
Figure 5:
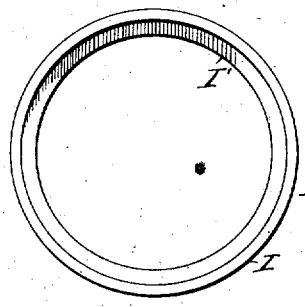
Figure 6:
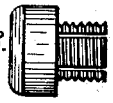
Figure 7:
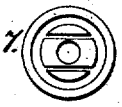
Figure 8:
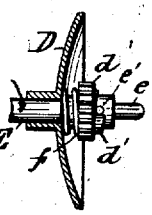
Figure 9:
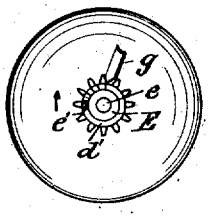
Figure 10:
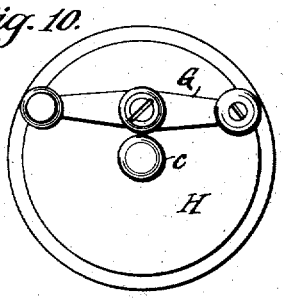
Figure 11:
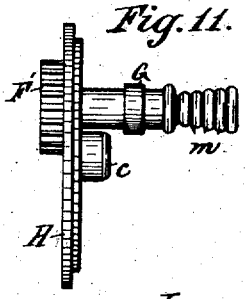

Figure 1 is a side elevation of the complete reel. Fig. 2 shows the inside of the recessed head containing the click. Fig. 3 is a longitudinal section on line 3 3 in Fig. 2. Fig. 4 is a section of the cap for the adjustable head-plate which carries the crank and crank-shaft gear, and Fig. 5 shows the inner side of such cap. Fig. 6 is a side elevation of one of the plugs containing the spindle-bearing, and Fig. 7 shows the inner end of the same. Fig. 8 is a section of the spool adjacent to the click-wheel and its clutch. Fig. 9 is an end view of the same with a portion of the pawl. Fig. 10 is an elevation of the head-plate, and Fig. 11 an edge view of the same as it appears detached from the reel-frame.

In Figs. 1, 2, and 3 of the drawings the frame is shown with two rings A A′ permanently connected by four tie-bars B, which are secured strongly in such rings. The space within the ring A is closed at one end by a plate $A^2$, leaving a recess C adjacent to the spool-flange D, in which space the click mechanism is contained. The spindle E of the spool is provided at one end with teeth F to engage the crank-shaft gear F′, which is connected with the usual crank G. The crank-shaft is carried in a head-plate H, which is fitted to turn freely upon the outer side of the ring A′ and is locked thereon when adjusted by a collar I, fitted to a thread upon the periphery of the ring A′ and having an annular flange I′ extended over the outer edge of the head-plate H to clamp it upon the ring. The rings and the head $A^2$ and head-plate H are commonly formed of vulcanite or other light compositions, and to protect the ring A as the periphery of the ring A′ is protected a metallic collar J is shown fitted over the same in Figs. 2 and 3. Lightness and strength are both secured by this construction.

In the centers of the plates $A^2$ and H a metallic socket-bushing *a* is secured and projected outwardly a short distance to form, when desired, a tubular guard for use in connection with a sleeve upon the adjustable bearing. Such bushing is threaded to form sockets for the plugs *b*, in which cylindrical bearings are provided for the cylindrical journals *c* upon the ends of the spindle E. (See Figs. 3 and 8.) The plugs are shown with longitudinal slots $b'$, leaving tongues at opposite sides of the plug, which can be sprung outwardly to produce a frictional contact with the thread of the socket $a$. The head of the plug is knurled, as shown in Fig. 6, to be turned by the fingers for adjusting the bearing longitudinally, so as to set the spool centrally in its frame. The bearing in the plug is cylindrical and of such depth that the bottom of the bearing may be secured against the end of the journal $e$ to form, when desired, a drag for the spool or line. With a cylindrical bearing a spool is supported centrally at all times and the teeth F kept continually in mesh with the driving-wheel F' when the bearings are slackened to let the spool run free. A sleeve $c$ is shown formed upon the head of the plug $b$ and fitted snugly to the tubular guard upon the projected end of the socket-bushing $a$, and such sleeve may be used, when desired, to exclude water and grit from the thread of the plug. The click wheel or pinion $d$ is shown in Figs. 3, 8, and 9 formed upon one side with a spiral clutch projection $d'$, and a pin or clutch projection $e'$ is shown formed upon the spindle E to engage the same.

A spring $f$ between the spool-flange $d$ and the pinion presses the pinion normally toward the pin $e'$, so that the pinion always clutches the spindle when the spindle is rotated in the direction of the arrows, shown in Figs. 2 and 8, and the fish-line is so attached to the spool that the pinion is clutched to the spindle when the line is running out. A pawl or click $g$ is mounted upon a stationary pivot upon the head $A^2$ within the recess C and pressed by a spring $h$ normally into the teeth of the pinion and is provided with a click-arm $i$, which is extended near the edge of the recess and actuated by a dog $h'$ to throw the pawl out of engagement with the pinion. A slot $k^2$ is extended through the ring and through the collar J to the outside of the head, and a thumb-piece $j$ is fitted to slide upon the exterior of the head and connected with the dog by a stud $k$, extended through the slot. The thumb-piece is fitted to the curvature of the periphery of the head $A^2$ and serves to close the slot $k^2$. A screw $k'$ connects the thumb-piece with the stud and furnishes a sufficient projection for the thumb to shift the dog when desired.

In Fig. 2 the dog is shown in full lines in an inoperative position with the pawl or click in full lines engaged with the click-pinion $d$. The dog is shown in dotted lines shifted in the direction of the arrow $l$ to its operative position, throwing the pawl out of engagement with the pinion, as indicated by the dotted pawl. The pivot of the pawl is so located that it slips over the teeth of the pinion and makes a clicking noise when the pinion is clutched to the spindle E; but the pawl locks the pinion when the pawl is turned in the opposite direction, and the click-pinion is prevented from turning when the line is reeled in.

The holding of the pinion stationary unclutches it from the spindle and prevents the noise of the click as long as the line is being reeled in.

The pinion is preferably made of non-resonant material like "vulcanite," "fiber," or rawhide, so that when the line is "reeled in" the repeated movements of the pin $e'$ past the clutch $d$ will not produce any sensible noise. Any form of ratchet-clutch may be used for connecting the wheel with the spindle. This feature of the invention is especially valuable upon large reels intended for catching tarpon and other gamy fish of great strength or weight, as in such cases the fisherman devotes his entire attention to the line while his boat is rowed by an assistant, and the production of the clicking noise only when the line is running out gives a signal of great value to the oarsman, as it advises him that the fish has "struck" and that the boat should not be rowed rapidly lest the line should be broken. With the construction shown the click may be thrown entirely out of action, so that the line will run out freely, as is required in making a "cast." The click may also be applied and yet operate only while the line is running out, and without removing the click the line may be reeled in without producing any clicking noise.

It will be observed that the thumb-piece $j$, which actuates the dog for setting the click, is upon the edge of the reel, where it can be reached much more readily while the line is running out than when placed upon one of the heads. It will also be observed that a drag may be produced upon the spool by adjusting either of the plugs $b$ (by turning its knurled head) and that the plug upon the reel-head opposite to the crank G can thus be reached at any time while the reel is running to apply the drag. The means for applying the drag and the click are thus perfectly accessible while the line is running out and gives the operator the most perfect control over the fish.

The exterior of the collar I is roughened, as shown in Fig. 1, to be readily turned and grasped by the hand, and the head-plate H can thus be instantly removed and the space adjacent to the spool-flanges cleaned out in case they become clogged by any obstruction.

Any means to facilitate the removal of the head from the reel-frame is of great value, as it permits the reel to be readily cleansed or washed out whenever it becomes clogged by falling in the sand, and the convenient removal of the head also permits a purchaser to examine the interior of the reel to ascertain its construction before buying the same.

The application of the flanged collars I and J to the exterior of the rings A and A′ serves not only to protect them from injury, but also to hold them from warping and to protect the corners from damage, which often occurs when the rings or heads of the reel are made of vulcanite. By the use of such collars a light composition can be employed in the construction of the head-rings without danger of warping or accidental injury. It is immaterial whether the rings upon both the heads be provided with detachable head-plates or not, as the removal of one head-plate obviously gives access to the entire interior of the reel.

A removable head-plate has been heretofore attached to a reel by screwing into the interior of the head-ring; but such construction affords no protection to the ring from injury or warping, as with the flanged collar I which we employ, and our construction also furnishes an additional advantage in that the head-piece is not screwed to the head of the reel at all, which would locate it always in the same position when screwed up tight, but is freely adjustable or capable of being turned into any position upon the head before it is clamped by the flanged ring I. This construction permits the operator to set the crank in any desired position upon the reel—either upon the nearer or farther side of the center or upon the inner or outer edge of the reel-head. In practice a bridge extended across the crank-shaft gear is attached to the inner side of the head-plate H when the latter is provided with the bearing for the crank-shaft, such bridge being used to form an inner bearing for the shaft; but we have not shown the bridge in our drawings, as it forms no part of th present invention.

The handle of the crank-shaft G is shown larger at the outer than at the inner end, and its surface is formed of a series of contiguous beads *m*, which, in connection with the inward taper upon the handle, prevent the fingers from slipping off of the same no matter how hastily it is turned.

The handle is swiveled upon the crank—that is, upon the crank-pin—in the usual manner, and thus remains in the fingers in the same position in which it may be grasped while turning the crank. We find this construction very effective and advantageous in operating the reel, as it is well known that the reel is operated with great haste in emergencies when a fish requires peculiar handling, and any construction of handle from which the fingers are liable to slip is a serious disadvantage.

When it is desired to combine the internally-threaded ring I and its flange I′ with the head-plate H for securing the same upon the body of a reel, it is obviously immaterial how such body be constructed.

Having thus set forth the nature of the invention, what is claimed herein is—

1. In a reel, the combination, with a reel-frame and a spool mounted therein, of means engaging one end of the frame and acting as a bearing for one end of the spool, and adjustable means engaging in the other end of the frame and acting as a bearing for the other end of the spool and adapted to carry operating mechanism for the spool.

2. In a fishing-reel, the combination, with a reel-frame and a spool mounted therein, of a handle, and an adjustable supporting means therefor, said means when adjusted adapted to vary the position of the axis of the handle in relation to the frame.

3. In a fishing-reel, the combination, with a reel-frame and spool mounted therein, of a handle, and means connected therewith and engaging in the frame to permit of adjusting the position of the said handle.

4. A fishing-reel provided with two heads, one of such heads having a ring connected with the opposite head by permanent ties and formed with screw-thread upon its exterior, a head-plate fitted to such ring, and a screw-collar fitted to the thread upon the ring and having the flat annular flange fitted to the under side of such head-plate and adapted to hold the head-plate adjustably upon the collar.

5. A fishing-reel provided with two heads, one of such heads having a ring connected with the opposite head by permanent ties and formed with screw-thread upon its exterior, a head-plate fitted to rotate upon such ring and a screw-collar fitted to the external thread upon the ring and having the flat annular flange fitted to the flat side of the head-plate and adapted to press the head-plate against the ring, the head-plate being fitted snugly to the interior of the collar so as to be centered thereby when adjusted.

6. A fishing-reel having heads with the spindle E mounted to turn therein, the spool D attached to the spindle, the click-pinion *d* fitted movably to the spindle adjacent to one of the heads and provided with a clutch, a pin or tooth upon the spindle to engage such clutch, means to press the pinion normally toward the pin or tooth, a click mounted upon a stationary pin upon the adjacent head and a spring upon the head operated to press the click normally upon the teeth of the pinion.

7. A fishing-reel having heads with the spindle E mounted to turn therein, the spool D attached to the spindle, the click-pinion *d* fitted movably to the spindle adjacent to one of the heads and provided with a clutch, a pin or tooth upon the spindle to engage such clutch, means to press the pinion normally toward the pin or tooth, a click mounted upon a stationary pin upon the adjacent head, a spring upon the head operated to press the click normally upon the teeth of the pinion, and means for throwing the click out of engagement with the pinion.

8. A fishing-reel having heads with the spindle E mounted to turn therein, the spool D attached to the spindle, the click-pinion *d* fitted movably to the spindle adjacent to one of the heads and provided with a clutch, a pin or tooth upon the spindle to engage such clutch, means to press the pinion normally toward the pin or tooth, a click mounted upon a stationary pin upon the adjacent head and a spring upon the head operated to press the click normally upon the teeth of the pinion, the click being arranged and operated to slip upon the teeth of the pinion to click on the same when clutched to its spindle, and to hold the pinion stationary when the pinion is unclutched from its spindle.

9. A fishing-reel having heads with spindle E mounted to turn therein and the head $A^2$ having the recess C, the spool D attached to the spindle, the click-pinion *d* fitted movably to the spindle within the recess, the click or pawl *g* mounted in the recess upon a stationary pivot on the head and fitted to the teeth of the pinion and provided with the click-arm *i* near the edge of the recess, and the thumb-piece *j* fitted movably upon the periphery of the head and having the dog *h'* extended from the thumb-piece into the recess to press upon the click-arm, for throwing the pawl out of engagement with the pinion.

10. A fishing-reel having heads with spindle E mounted to turn therein and the head $A^2$ having the recess C, the spool D attached to the spindle, the click-pinion *d* fitted movably to the spindle within the recess, the click or pawl *g* mounted in the recess upon a stationary pivot on the head and fitted to the teeth of the pinion and provided with the click-arm *i* near the edge of the recess, the slot $k^2$ extended from the recess to the outside of the head, the dog *h'* fitted to the edge of the recess to engage the click-arm *i*, the thumb-piece *j* curved to fit the exterior of the head and cover the slot $k^2$ and the stud *k* connecting the thumb-piece and the dog through the slot, whereby the pawl may be thrown out of engagement with the pinion by the peripheral movement of the thumb-piece.

11. The fishing-reel having the heads provided with composition rings A, A', connected by permanent ties, the metallic flanged collars I and J applied to the peripheries of the heads, the collar I having an internal thread screwed upon the periphery of the ring A', and having the annular flange I', the head-plate H secured adjustably upon the ring A' by the collar I and flange I', such head-plate carrying the reel-gearing bearings attached to the heads, the spindle E fitted to the bearings and the spool D attached to the spindle and connected to the reel-gearing, substantially as herein set forth.

12. A fishing-reel having a reel-head with a threaded socket in the center, a tubular guard projected outwardly from such socket, the screw-plug *b* fitted to such socket and having cylindrical bearing for the journal of the spool and such plug split longitudinally to press elastically upon the socket, and provided with the sleeve *c* fitted to the exterior of the tubular guard, as and for the purpose set forth.

13. A fishing-reel having cylindrical journals upon the spindle of the spool and reel-heads having each the bushing *a* forming a threaded socket in line with the said spindle, and the screw-plugs *b* fitted to such sockets and provided with cylindrical bearings for the journals of the spools and split longitudinally as set forth to retain them in place when adjusted, the bottoms of the cylindrical bearings being adapted to contact with the ends of the spindle to form a drag upon the spools when required.

14. A fishing-reel having a head formed with external screw-thread upon the same, a head-plate fitted to the end of the head, and the screw-collar I having internal thread fitted to the thread upon the head and having the flat annular flange I' fitted to the outer side of such head-plate and adapted to clamp the head-plate adjustably upon the head.

15. A fishing-reel having a reel-frame, a head-plate fitted adjustably to one end of the reel-frame, and a screw-collar fitted to the end of the reel-frame and provided with means for clamping the head-plate thereto.

16. In a fishing-reel, the combination, with a reel-frame having a screw-thread formed upon its exterior at one end, of a head-plate fitted to the end of the reel-frame, and a screw-collar fitted to the said thread and having flange adapted to clamp the head-plate to the end of the reel-frame, whereby the head-plate is held adjustably upon the frame.

17. A fishing-reel having a reel-frame, a head-plate fitted to one end of the reel-frame and a screw-collar separate from the head-plate fitted to the end of the reel-frame and provided with means for clamping the head-plate thereto.

18. A fishing-reel having a head formed with an external screw-thread upon the same, a head-plate fitted to the end of the head, and the screw-collar I having an internal thread fitted to the thread upon the head and having a flat annular flange I' fitted to the outer side of said head-plate to clamp said head-plate upon the head.

19. A fishing-reel provided with a head, a head-plate fitted to and secured upon said head, and a collar having an annular flange fitted to and secured upon said head and clamping said head-plate upon the head.

20. A fishing-reel having a head formed with an external screw-thread upon the same, a head-plate fitted to the end of the head, a screw-collar having an internal thread fitted to the thread upon the head, and having a flat annular internally-projecting flange fitted to the outer side of said head-plate and designed to clamp the head-plate upon the head.

21. A fishing-reel having a reel-frame, a head-plate fitted to one end of the reel-frame, and a screw-collar fitting one end of the reel-frame, and provided with means for clamping the head-plate thereto.

This specification signed and witnessed this 26th day of August, 1904.

AUGUST F. MEISSELBACH.
WILLIAM MEISSELBACH, JR.

Witnesses:
FREDK. C. FISCHER,
LOUIS M. SANDERS.